United States Patent [19]
Takahashi et al.

[11] Patent Number: 6,117,257
[45] Date of Patent: Sep. 12, 2000

[54] METHOD FOR SHEATHING SUBSTRATE WITH FLUORINE RESIN TUBE AND FIXING MEMBER FABRICATED BY THE METHOD

[75] Inventors: Masaaki Takahashi, Asaka; Kazuo Kishino, Kawasaki; Hideo Kawamoto, Tokyo, all of Japan

[73] Assignee: Canon Kabushiki Kaisha, Tokyo, Japan

[21] Appl. No.: 08/997,529

[22] Filed: Dec. 23, 1997

[30] Foreign Application Priority Data

Dec. 27, 1996 [JP] Japan ................................ 8-349531

[51] Int. Cl.[7] ...................................................... B32B 1/08
[52] U.S. Cl. ...................... 156/86; 156/294; 156/272.2; 156/308.2; 264/322; 264/230; 29/895.212
[58] Field of Search ........................ 156/86, 272.2, 156/273.3, 273.5, 308.2, 245, 294; 29/895.212, 895.1, 895.23, 895.32; 425/500, 508, 392; 264/36.12, 26.16, 230, 322, DIG. 71, 313; 492/48, 56; 399/328, 330, 333

[56] References Cited

U.S. PATENT DOCUMENTS

| | | | |
|---|---|---|---|
| 3,749,621 | 7/1973 | Shoffner | ................................ 156/86 |
| 5,067,912 | 11/1991 | Bickford et al. | ........................ 29/842 |
| 5,319,427 | 6/1994 | Sakurai et al. | . |
| 5,608,508 | 3/1997 | Kumagai et al. | . |
| 5,717,988 | 2/1998 | Jinzai et al. | . |
| 5,725,209 | 3/1998 | Takahashi et al. | . |
| 5,944,930 | 8/1999 | Takeuchi et al. | ...................... 156/218 |
| 5,968,300 | 10/1999 | Shimura et al. | ........................ 156/190 |

*Primary Examiner*—Michael W. Ball
*Assistant Examiner*—Barbara Musser
*Attorney, Agent, or Firm*—Fitzpatrick, Cella, Harper & Scinto

[57] ABSTRACT

A method for sheathing a substrate with a fluorine resin tube in accordance with the present invention includes placing a substrate sheathed with a heat-shrinkable fluorine resin tube into a cylindrical surface transfer member and heat-pressing the heat-shrinkable fluorine resin tube between the substrate and the cylindrical surface transfer member so that the heat-shrinkable fluorine resin tube is melt-bonded to the substrate. The fluorine resin tube after sheathing has excellent heat resistance and strength, and has a desired surface unevenness.

10 Claims, 5 Drawing Sheets

METHOD FOR SHEATHING SUBSTRATE WITH FLUORINE RESIN TUBE AND FIXING MEMBER FABRICATED BY THE METHOD

BACKGROUND OF THE INVENTION

1. Field of the Invention

The present invention relates to a method for sheathing a substrate with a fluorine resin tube, and a fixing member which is fabricated by the method and used in electrophotographic image-forming apparatuses such as copying machines and laser beam printers.

2. Description of the Related Art

Typical known methods for sheathing a substrate with a fluorine resin tube on a hollow or solid cylindrical substrate include:

1) Applying a bonding agent onto the surface of a rubber roller, which has been previously fabricated, sheathing the surface with a heat-shrinkable fluorine resin tube, and bonding it to the substrate by heat shrinkage; and 2) Placing a fluorine resin tube, in which a bonding agent is applied on the preliminarily treated inner surface, into a cylindrical mold, and then injecting a liquid rubber between the fluorine resin tube and a core bar.

In these processes, bonding of the fluorine resin tube is generally performed at a temperature which is considerably lower than the melting point of the fluorine resin in order to ensure processability and to prevent deterioration of the rubber of the base layer.

Typical methods for fixing rollers, which are used as fixing members in electrophotographic image-forming apparatuses, include: sheathing a metallic substrate with a heat-shrinkable fluorine resin tube as a toner-releasing layer followed by bonding by means of a hot melt process; forming a heat-resistant rubber layer on a metallic core bar and bonding a heat-shrinkable fluorine resin tube as a toner-releasing agent thereon by the above-mentioned process; and sheathing a substrate composed of metal and a heat-resistant resin formed thereon with a heat-shrinkable fluorine resin tube as a toner-releasing layer, followed by bonding by means of a hot melt process. A typical method for making fixing belts includes forming a heat-resistant rubber layer on a film composed of a metal or heat-resistant resin film and bonding a heat-shrinkable fluorine resin tube as a toner-releasing agent thereon by the above-mentioned process. Also, a typical method for fabricating a pressure roller includes forming a heat-resistant rubber layer onto a metallic core bar and then bonding a fluorine resin tube as a toner-releasing agent thereon by the above-mentioned process.

The above-mentioned methods for sheathing the substrates with the fluorine resin tubes, however, have the following problems. Each fluorine resin tube is bonded to the rubber layer of the substrate with an adhesive agent since the bonding process is performed at a temperature which is considerably lower than the melting temperature of the fluorine resin in order to prevent the deterioration of the rubber layer of the substrate. When flaws form on the tube, peeling by stress will easily occur between the tube and the rubber, or dead folds or wrinkles will be observed on the tube. Since the fixing roller is always heated, the strength of the fixing roller gradually decreases as a result of deterioration from long-term use, and thus wrinkles form which will cause to be less smooth or will cause a rupture. Although the bonding strength is improved by the treatment of the inner surface of the fluorine resin tube, such as chemical treatment, such a treatment requires particular chemicals and equipment, resulting in high production costs. Further, the treated surface will be rapidly changed by its environment.

Accordingly, it is difficult to easily and stably sheath a fluorine resin tube by bonding such that the resulting roller has sufficient heat resistance and strength. Further, the fluorine resin sheath does not have a smooth surface for practical use.

SUMMARY OF THE INVENTION

It is an object of the present invention to provide a method for sheathing a substrate with a fluorine resin tube having high heat resistance and strength.

It is another object of the present invention to provide a method for sheathing a substrate with a fluorine resin tube having high heat resistance and strength and a desired surface roughness.

It is a further object of the present invention to provide a fixing member produced by such a method.

In accordance with the present invention, a method for sheathing a substrate with a fluorine resin tube includes placing a substrate sheathed with a heat-shrinkable fluorine resin tube into a cylindrical surface transfer member and heat-pressing the heat-shrinkable fluorine resin tube between the substrate and the cylindrical surface transfer member so that the heat-shrinkable fluorine resin tube is melt-bonded to the substrate.

In the method for sheathing the substrate in accordance with the present invention, uniform heat-pressing of the fluorine resin tube is achieved between the substrate and the inner surface of the cylindrical surface transfer member, hence the melted fluorine resin tube is rapidly and tightly bonded to the substrate. Since air between the fluorine resin tube and the substrate is released by thermal shrinkage of the fluorine resin tube, the fluorine resin tube is uniformly bonded to the substrate by such a melting process. Further, the fluorine resin tube is heated such that the fluorine resin tube is melt-bonded to the substrate. Since the fluorine resin tube is easily deformed in this process, the surface of the inner wall of the cylindrical surface transfer member is duplicated onto the fluorine tube surface. That is, when the inner wall has a smooth surface, the fluorine tube also has a smooth surface, or when the inner wall surface has a given pattern or a rough surface, the fluorine tube also has such a given pattern or a rough surface. Accordingly, a fluorine tube sheathed member having excellent durability and a given surface is provided by the method in accordance with the present invention.

DETAILED DESCRIPTION OF THE PREFERRED EXAMPLES

Figure 1A:
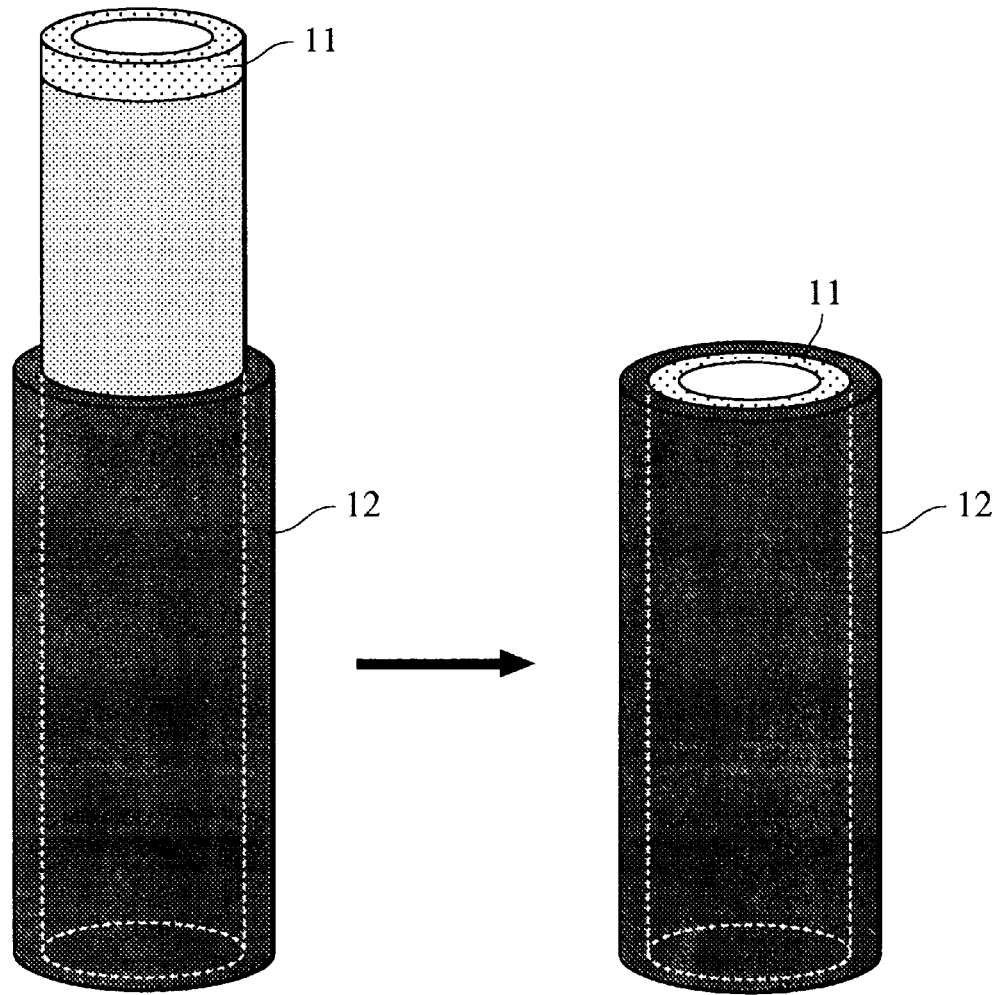
FIG. 1A is an outlined view of a method for sheathing a cylindrical substrate with a fluorine resin tube using a cylindrical surface transfer member in accordance with Example 1 of the present invention.

The present invention will now be described in detail with reference to the drawings.

A typical method for pressing a fluorine resin tube between a substrate and a surface transfer member includes pressing while rotating a hollow or solid cylindrical substrate sheathed with a fluorine resin tube onto a hollow cylindrical surface transfer member with a given pattern.

Any materials can be used for the surface transfer member as long as they do not deform at a temperature when a fluorine resin tube is melted. Examples of such materials include metals, such as iron, stainless steel, and aluminum; and heat-resistant resins, such as polyimides and polyphenylene sulfides.

In another Example in accordance with the present invention, a hollow or solid cylindrical substrate is sheathed with a heat-shrinkable fluorine resin tube, and the fluorine resin tube is shrunk with heat and then pressed between the substrate and a surface transfer member provided on the outside of the fluorine resin tube so that the fluorine resin tube is bonded to the substrate. It is preferable that the heat, which is supplied for shrinking the fluorine resin tube, be as low as possible.

When a fluorine resin tube, which is previously shrunk with heat on a substrate, is bonded to the substrate by pressing the shrunken fluorine resin tube, the occurrence of remnants of air between the fluorine resin tube and the substrate can be effectively prevented compared with the case in which the fluorine resin tube is not previously shrunk. Examples of heat-shrinkable fluorine resins suitable for the fluorine resin tubes include tetrafluoroethylene-perfluoroalkyl vinylether copolymers (PFA) and tetrafluoroethylene-hexafluoropropylene copolymer (FEP).

Other methods for pressing the fluorine resin tube between the substrate and the surface transfer member, and other materials for the surface transfer member may also be used in the present invention without restriction.

Also, a hollow cylinder having an inner face provided with a given pattern and having an inner diameter capable of inserting a substrate sheathed with a fluorine resin tube may be used as a surface transfer member. When the substrate has a thermal expansion coefficient which is different from that of the surface transfer member, the fluorine resin tube is readily pressed during heating. Any pressing processes suitable for such an Example may be used without restriction as described below.

When the thermal expansion coefficient of the substrate sheathed with the fluorine resin tube is larger than that of the surface transfer member, the substrate sheathed with the fluorine resin tube is inserted into the surface transfer member and heated. The fluorine resin tube is therefore pressed between the substrate and the surface transfer member due to thermal expansion of the substrate which is more prominent than that of the surface transfer member, and thus the fluorine resin tube is tightly melt-bonded to the substrate.

When the thermal expansion coefficient of the substrate sheathed with the fluorine resin tube is smaller than that of the surface transfer member, the substrate sheathed with the fluorine resin tube is inserted into the surface transfer ember, of which the outer face is fixed, followed by heating. The fluorine resin tube is therefore pressed between the substrate and the fixed surface transfer member due to thermal expansion of the substrate, and thus the fluorine resin tube is tightly melt-bonded to the substrate.

When the surface pattern provided on the surface transfer member is transferred onto the surface of the fluorine resin tube, any materials for the substrate or the surface transfer member and any methods for heating them may be employed without restriction in the present invention.

The substrate may be composed of a plurality of layers and the surface layer of the substrate may be composed of a heat-resistant rubber. When the substrate has a rubber surface layer which easily deteriorates at the melting point of the fluorine resin, the fluorine resin tube cannot be heated to the melting point for shrinking the tube. On the other hand, when the heating temperature or the heating time is decreased, tight bonding cannot be achieved. High-temperature short-interval heating, which prevents thermal deterioration of the rubber substrate layer, causes hang-down of the tube ends, unevenness of the tube surface and occurrence of foaming in the tube surface. The smoothness and the strength of the fluorine resin tube is lessened.

In contrast, when the fluorine resin tube has pressure applied to it while heating between the substrate and the fluorine resin tube, and the fluorine resin tube is easily melt-bonded to the substrate at a lower temperature for a shorter time, and thus the deterioration of the surface rubber layer of the substrate can be suppressed. Further the fluorine resin tube can be tightly bonded by the pressure applied to the substrate between the substrate and the surface transfer member.

When the substrate is composed of a fluorine-resin-dispersed fluorine rubber having a ratio of the fluorine resin: the fluorine rubber of from 49:51 to 20:80, a high bonding strength is achieved after melting the fluorine resin tube.

When the outside of the surface transfer member is heated with an infrared heater, the fluorine resin tube and the bonding interface are rapidly heated without deterioration of the rubber layer, and thus the fluorine resin tube is tightly bonded to the substrate within a shorter time.

When 50% or more of the infrared rays passes through the surface transfer member, the fluorine resin tube and the bonding interface are rapidly heated and thus the fluorine resin tube is bonded to the substrate with decreased energy.

When the absorption factor is such that the surface transfer member≦the fluorine resin tube<the substrate surface (bonding interface), the bonding interface is directly heated, hence the fluorine resin tube is effectively and tightly bonded to the substrate.

The use of a thin polyimide tube, which has high heat resistance and high temperature strength, as the surface transfer member improves the durability of the surface transfer member and can be handled with ease.

In these methods, a pattern provided on the inner surface of the surface transfer member is transferred onto the surface of the fluorine resin tube during bonding the tube to the substrate.

Fixing members used in electrophotographic image-forming apparatuses require toner-releasing characteristics, hence their surface layers are generally composed of a fluorine resin. The surface fluorine resin layer of the fixing roller or fixing film, which comes into contact with unfixed toner, must be smooth to prevent irregular gloss of the printed image. Irregular gloss is generated by the transfer of the surface pattern of the fluorine resin surface layer of the fixing roller or fixing film onto the surface of the toner image, and significantly prominent when a solid image, and particularly a photographic color image is printed. According to investigation by the present inventors, the irregular gloss of the printed image depends on the surface roughness of the fixing roller or the fixing film, and the occurrence of the irregular gloss is prevented when the surface roughness, by the ten-point average roughness Rz according to JIS 0601-1982, of the fixing roller or the fixing film is 5 µm or less (the standard length: 2.5 mm). By any of the conventional processes, however, a desirable roughness is not formed on the surface of the fluorine resin tube, and dead folds or wrinkles on the fluorine resin tube will not disappear.

In contrast, when the fixing roller or the fixing film substrate is sheathed with the fluorine resin tube, and the fluorine resin tube is pressed while being heated between the fixing roller or the fixing film substrate and the surface transfer member using the method in accordance with the present invention, a desired pattern can be formed on the fluorine resin surface layer of the fixing roller or the fixing film. For example, when a pattern with a roughness of 5 µm or less is previously formed on the surface transfer member, the pattern is duplicated to the surface of the fluorine resin tube of the fixing member during the bonding process of the tube to the substrate. The fluorine resin therefore has an adequate surface roughness, for example, 5 µm or less, and irregular gloss of the image can be prevented.

Materials suitable for the substrate of the fixing roller or fixing film in accordance with the present invention are not limited. Examples of the substrates of the fixing roller include metallic core bars composed of iron, aluminum or the like and multi-layered substrates composed of metallic core bars covered with heat-resistant rubbers, such as silicone rubbers and fluorine rubbers. Examples of the fixing film substrates include heat resistant resin films, such as polyimide films, metallic films composed of nickel, iron or the like, and composite films in which heat-resistant rubber layers composed of silicone rubber or fluorine rubber are formed on the above-mentioned films.

Among fixing members, the fixing member used for transferring a transferring member must have a surface roughness to ensure stable transfer of the transferring member. The preferable surface roughness for ensuring the stable transfer ranges from 2 to 20 µm by the ten-point average roughness Rz. The optimum roughness may be determined depending on transfer characteristics and other characteristics such as image quality within the above-mentioned range.

The surface roughness of the fluorine resin tube of the fixing member is simultaneously formed at the bonding process of the fluorine resin tube to the substrate in accordance with the present invention. For example, when an uneven pattern with a roughness of 2 to 20 µm is previously formed onto the surface transfer member, the surface of the surface transfer member is duplicated onto the surface of the fluorine resin tube as the surface layer of the fixing member during the bonding process. As a result, the surface of the fluorine resin tube has a roughness of 2 to 20 µm and thus the fixing member has excellent transfer characteristics of transferring members. A fluorine resin tube having a roughness of 5 µm or less, and in particular 2 µm or less is preferred in view of effectively preventing irregular gloss of fixed images.

EXAMPLE 1

The method in accordance with Example 1 of the present invention will now be described with reference to FIGS. 1A and 1B.

Figure 1B:
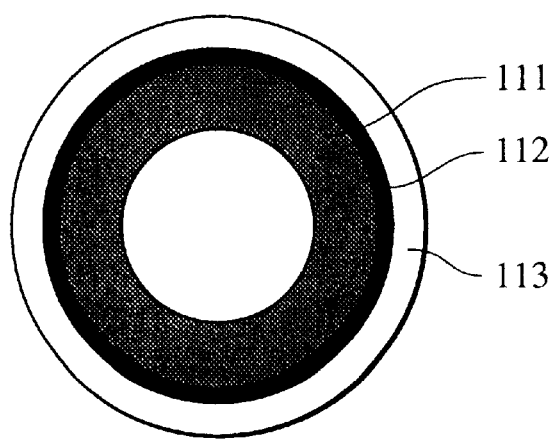
FIG. 1B is a cross-sectional view of the cylindrical substrate.

FIG. 1B is a cross-sectional view of a cylindrical substrate 11 provided with an outermost layer composed of a fluorine resin tube. A core bar 111 of the cylindrical substrate is composed of aluminum and has a diameter of 40 mm. A fluorine resin primer layer 112 was formed on the core bar 111 to ensure tight adhesion between the fluorine resin layer and the core bar 111, and a fluorine tube layer 113 composed of a GF tube (trade name; made by Gunze Sangyo, Inc) was formed thereon. The primer layer 112 with a thickness of 8 µm was formed by spraying an aqueous fluorine resin primer (trade name: Polyflon TCW8109BK; made by Daikin Industries, Ltd.) and drying it at 150° C. for 30 minutes. The cylindrical substrate was inserted into a heat-shrinkable fluorine resin tube 113, composed of tetrafluoroethylene-perfluoroalkyl vinylether (TFA) copolymer, having an inner diameter of 42 mm, a thermal shrinkage factor of 15%, and a thickness of 25 µm. The fluorine resin tube 113 was heated at 200° C. for 15 minutes in an oven with internal air circulation. The substrate 111 was thereby tightly sheathed with the fluorine resin tube 113, although the tube 113 did not adhere to the substrate 111.

A surface transfer member 12 is a hollow cylinder with an inner diameter of 40.2 mm, and a thickness of 3.0 mm. The surface transfer member 12 in accordance with Example 1 was composed of stainless steel with a low thermal expansion coefficient. A substrate 11 sheathed with a heat-shrinkable fluorine resin tube and subjected to the heat shrinking treatment was inserted into the surface transfer member 12 and fixed with a fixer not shown in the drawing such that the substrate 11 and the surface transfer member 12 had a common axis. A gap of approximately 60 µm was provided between the substrate 11 sheathed with the fluorine resin tube and the surface transfer member 12. The composite of the substrate 11 and the surface transfer member 12 was heated at 290° C., which is lower than the melting point of the fluorine resin tube, for 20 minutes in an oven with internal air circulation. Since the thermal expansion coefficient of the aluminum core bar of the substrate was larger than that of the stainless steel surface transfer member, the 60-µm gap between the surface transfer member and the substrate disappeared as a result of thermal expansion of the aluminum core bar and thus the fluorine resin tube layer was compressed. Further, the fluorine resin (PFA) tube as the surface layer of the substrate was melted by heat-pressing at 290° C. and was tightly melt-bonded to the substrate 11. The substrate was cooled with the surface transfer member, and was removed from the surface transfer member. The fluorine resin tube was significantly tightly bonded to the substrate by heat-pressing between the substrate and the surface transfer member such that the fluorine resin tube did not peel from the substrate even when a high stretching force was applied to a flaw provided on the fluorine resin tube. Further, no bubbles were observed at the melt-bonded interfaces on ten substrates.

EXAMPLE 2

Figure 2A:
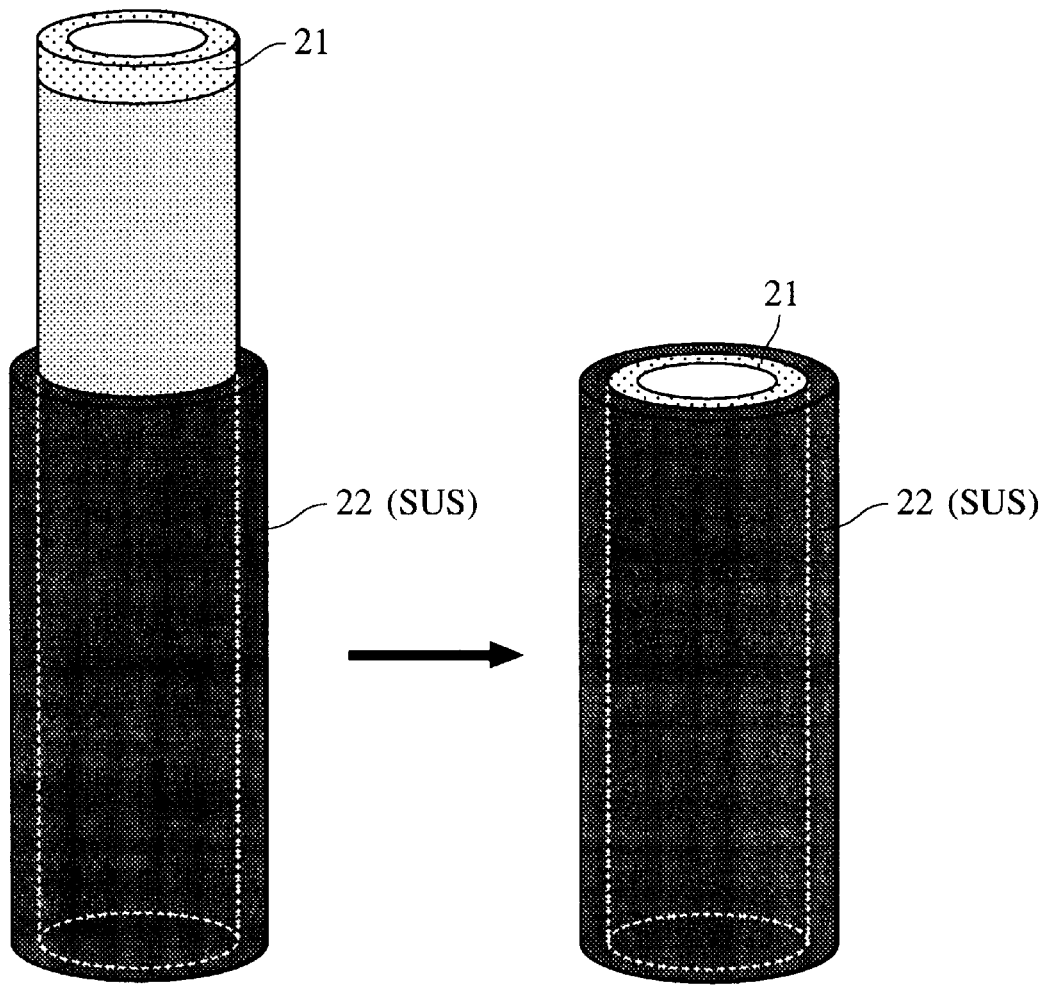
FIG. 2A is an outlined view of a method for sheathing a cylindrical substrate with a fluorine resin tube using a cylindrical surface transfer member in accordance with Example 2 of the present invention.

The method in accordance with Example 2 of the present invention will now be described with reference to FIGS. 2A and 2B.

Figure 2B:
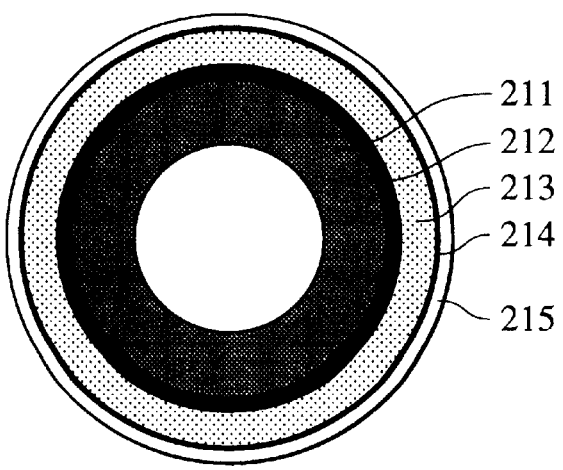
FIG. 2B is a cross-sectional view of the cylindrical substrate.

FIG. 2B is a cross-sectional view of a cylindrical substrate 21 provided with an outermost layer composed of a fluorine resin tube. A core bar 211 of the cylindrical substrate is composed of stainless steel and has a diameter of 40 mm. A low-temperature-vulcanization (LTV) silicone rubber layer 213 with a thickness of 1 mm composed of DY35-561 (trade name) made by Toray Dow Silicon Co., Ltd. is bonded onto the core bar 211 with a primer layer 212 provided therebetween. The silicone rubber layer was formed by inserting the core bar, in which a primer was applied onto the surface of the core bar 211, into a cylindrical mold, by injecting the LTV silicone rubber and by curing it with heat. The primer layer 214 was provided to ensure tight adhesion between the silicone rubber layer 213 and the fluorine resin tube surface layer, and was composed of a 45:55 mixture of a fluorine rubber, Daiel GL 252 (made by Daikin Industries, Ltd.) and a fluorine resin (FEP), Neoflon NDI (made by Daikin Industries, Ltd.). The primer layer 214 with a thickness of 25 $\mu$m was formed by spraying an aqueous primer solution of the above resinous mixture and heating to cure it at 200° C. for 30 minutes. The cylindrical substrate was inserted into a heat-shrinkable fluorine resin tube 213, composed of a TFA copolymer, having an inner diameter of 42 mm, a thermal shrinkage factor of 15%, and a thickness of 25 $\mu$m. The fluorine resin tube 215 was heated at 200° C. for 15 minutes in an oven with internal air circulation. The substrate 21 was thereby tightly sheathed with fluorine resin tube 215, although the tube 215 did not adhere to the substrate 21.

A surface transfer member 22 is a hollow cylinder with an inner diameter of 42.2 mm, and a thickness of 3.0 mm. The surface transfer member 22 in accordance with Example 2 is composed of stainless steel. A substrate 21 sheathed with a heat-shrinkable fluorine resin tube and subjected to the heat shrinking treatment was inserted into the surface transfer member 22 and fixed with a fixer not shown in the drawing such that the substrate 21 and the surface transfer member 22 had a common axis. A gap of approximately 60 $\mu$m was provided between the substrate 21 sheathed with the fluorine resin tube and the surface transfer member 22. The composite of the substrate 21 and the surface transfer member 22 was heated at 290° C., which is lower than the melting point of the fluorine resin tube, for 20 minutes in an oven with internal air circulation. Since the thermal expansion coefficient of the silicone rubber is larger than that of the stainless steel surface transfer member, the 60-$\mu$m gap between the surface transfer member and the substrate disappeared as a result of thermal expansion of the silicone rubber and thus the fluorine resin tube layer was compressed. Further, the fluorine resin (PFA) tube as the surface layer of the substrate was melted by heat-pressing at 290° C. and was tightly melt-bonded to the substrate 21. The substrate was cooled with the surface transfer member and was removed from the surface transfer member. The fluorine resin tube was significantly tightly bonded to the substrate by heat-pressing between the substrate and the surface transfer member such that the fluorine resin tube did not peel from the substrate as in Example 1. Further, no bubbles were observed at the melt-bonded interface. The silicone rubber did not deteriorate during the melt-bonding process.

EXAMPLE 3

Figure 3A:
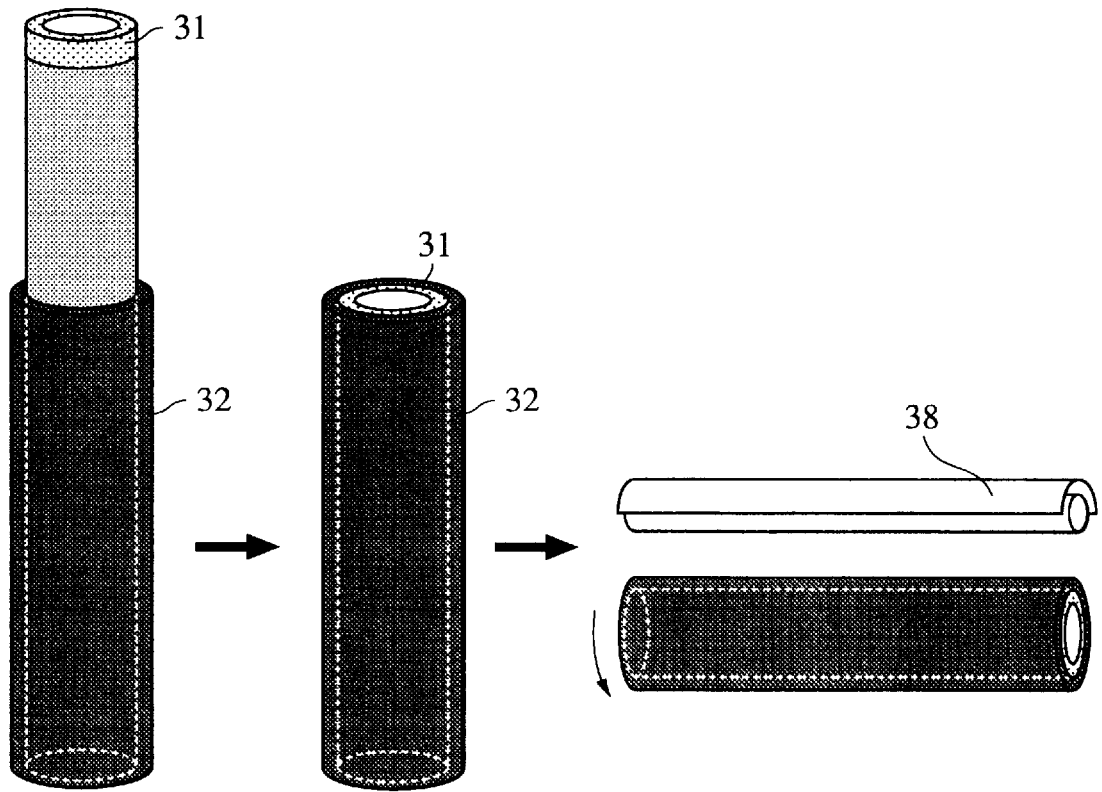
FIG. 3A is an outlined view of a method for forming a fluorine resin layer onto a cylindrical substrate using a cylindrical surface transfer member in accordance with Examples 3 to 6 of the present invention.

The method in accordance with Example 3 of the present invention will now be described with reference to FIGS. 3A and 3B.

Figure 3B:
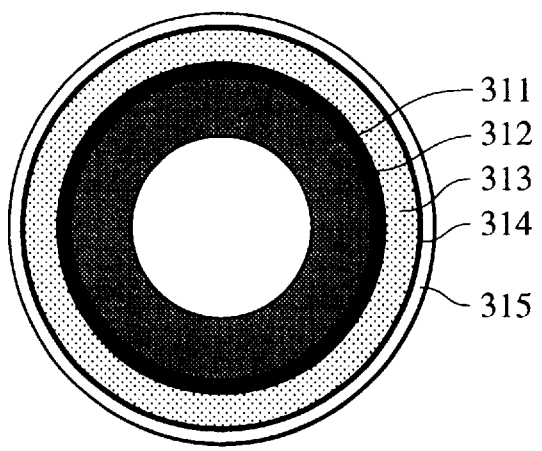
FIG. 3B is a cross-sectional view of the cylindrical substrate.

FIG. 3B is a cross-sectional view of a cylindrical substrate 31 provided with an outermost layer composed of a fluorine resin tube. A core bar 311 of the cylindrical substrate 31 is composed of stainless steel and has a diameter of 40 mm. A silicone rubber layer 313 with a thickness of 1 mm composed of the low-temperature-vulcanization (LTV) is bonded onto the core bar 311 with a primer layer 312 provided therebetween. The silicone rubber layer was formed by inserting the core bar, in which a primer was applied onto the surface of the core bar 311, into a cylindrical mold, by injecting the LTV silicone rubber and by curing it with heat. The primer layer 312 was provided to ensure tight adhesion between the silicone rubber layer 313 and the fluorine resin tube surface layer, and composed of a 45:55 mixture of the fluorine rubber, and the fluorine resin as in Example 2. The primer layer 314 with a thickness of 25 $\mu$m was formed by spraying an aqueous primer solution of the above resinous mixture and heating to cure it at 200° C. for 30 minutes. The cylindrical substrate was inserted into a heat-shrinkable fluorine resin tube 315, composed of a PFA copolymer, having an inner diameter of 42 mm, a thermal shrinkage factor of 15%, and a thickness of 25 $\mu$m. The fluorine resin tube 315 was heated at 200° C. for 15 minutes in an oven with internal air circulation. The substrate 31 was thereby tightly sheathed with fluorine resin tube 315, although the tube 315 did not adhered to the substrate 31.

A surface transfer member 32 is a hollow cylinder with an inner diameter of 42.2 mm, and a thickness of 0.05 mm. The surface transfer member 32 in accordance with Example 3 is formed of a nickel electrocast film. A substrate 31 sheathed with a heat-shrinkable fluorine resin tube and subjected to the heat shrinking treatment was inserted into the surface transfer member 32 and fixed with a fixer not shown in the drawing such that the substrate 31 and the surface transfer member 32 had a common axis. A gap of approximately 60 $\mu$m was provided between the substrate 31 sheathed with the fluorine resin tube and the surface transfer member 32. The composite of the substrate 31 and the surface transfer member 32 was heated for approximately 8 minutes with a 3 kw infrared line heater 38 (a parallel beam type) with a length that was nearly equal to the length of the substrate and was about 50 mm distant from the surface transfer member 32. Since the thermal expansion coefficient of the silicone rubber was larger than that of the nickel surface transfer member, the 60-$\mu$m gap between the surface transfer member and the substrate disappeared as a result of thermal expansion of the silicone rubber and thus the fluorine resin tube layer was compressed. Further, the fluorine resin (PFA) tube as the surface layer of the substrate was melted by heating and was tightly melt-bonded to the substrate 31. The substrate was cooled with the surface transfer member, and was removed from the surface transfer member. The fluorine resin tube was significantly tightly bonded to the substrate by heat-pressing between the substrate and the surface transfer member such that the fluorine resin tube did not peel from the substrate as in Example 1. Further, no bubbles were observed at the melt-bonded interface. The infrared ray heater permitted a significantly shorter heating cycle than that of the oven heating. The silicone rubber did not deteriorate during the melt-bonding process.

EXAMPLE 4

A substrate 31 was tightly sheathed with a heat-shrinkable PFA resin tube 315 as in Example 3, although the fluorine resin tube is not bonded to the substrate.

A surface transfer member 32 is a hollow cylinder with an inner diameter of 42.2 mm, and a thickness of 1 mm. The surface transfer member 32 in accordance with Example 4 is formed of a heat-resistant glass. The heat-resistant glass has an infrared transmittance of 90% or more. The fluorine resin tube also has an infrared transmittance of 90% or more. The mixture of the fluorine rubber and the fluorine resin (FEP) as the primer has an infrared transmittance of 10% or less.

A substrate 31 sheathed with a heat-shrinkable fluorine resin tube and subjected to the heat shrinking treatment was inserted into the surface transfer member 32 and fixed with a fixer not shown in the drawing such that the substrate 31 and the surface transfer member 32 had a common axis. A gap of approximately 60 µm was provided between the substrate 31 sheathed with the fluorine resin tube and the surface transfer member 32. The composite of the substrate 31 and the surface transfer member 32 was heated for approximately 5 minutes with a 3 kw infrared line heater 38 (a parallel beam type) with a length which was nearly equal to the length of the substrate and was about 50 mm distant from the surface transfer member 32. Since the heat-resistant glass surface transfer member and the fluorine resin tube absorb only small amounts of infrared rays, these were slightly expanded by the infrared radiation, and the melt-bonding interface was selectively heated. Further, since the thermal expansion coefficient of the silicone rubber was larger than that of the heat-resistant glass surface transfer member, the 60-µm gap between the surface transfer member and the substrate disappeared as a result of thermal expansion of the silicone rubber and thus the fluorine resin tube layer was compressed more effectively with a lower input energy. Further, excessive melt flow characteristics of the fluorine resin tube was prevented because of the selective heating of the melt-bonding interface. As a result, the fluorine resin tube was tightly bonded to the substrate 31 without sagging at either end of the roller.

The substrate was cooled with the surface transfer member, and was removed from the surface transfer member. The fluorine resin tube was significantly tightly bonded to the substrate by heat-pressing between the substrate and the surface transfer member such that the fluorine resin tube did not peel from the substrate as in Example 1. The selective heating of the interface permits a shorter heating cycle than that in Example 3, without formation of bubbles or sagging. The silicone rubber did not deteriorate during the melt-bonding process.

EXAMPLE 5

A substrate 31 was tightly sheathed with a heat-shrinkable PFA resin tube 315 as in Example 3.

A surface transfer member 32 is a hollow cylinder with an inner diameter of 42.2 mm, and a thickness of 0.05 mm. The surface transfer member 32 in accordance with Example 5 is formed of a polyimide resin. The polyimide resin has an infrared transmittance of 90% or more. The fluorine resin tube also has an infrared transmittance of 90% or more. The mixture of the fluorine rubber and the fluorine resin (FEP) as the primer has an infrared transmittance of 10% or less.

A substrate 31 sheathed with a heat-shrinkable fluorine resin tube and subjected to the heat-shrinking treatment was inserted into the surface transfer member 32 and fixed with a fixer not shown in the drawing such that the substrate 31 and the surface transfer member 32 had a common axis. A gap of approximately 60 µm was provided between the substrate 31 sheathed with the fluorine resin tube and the surface transfer member 32. The composite of the substrate 31 and the surface transfer member 32 was heated for approximately 3 minutes with a 3 kw infrared line heater 38 (a parallel beam type) with a length which was nearly equal to the length of the substrate and was about 50 mm distant from the surface transfer member 32. Since the polyimide surface transfer member and the fluorine resin tube absorbed only small amounts of infrared rays, these were slightly expanded by the infrared radiation, and the melt-bonding interface was selectively heated. Further, since the thermal expansion coefficient of the silicone rubber was larger than that of the polyimide surface transfer member, the 60-µm gap between the surface transfer member and the substrate disappeared as a result of thermal expansion of the silicone rubber and thus the fluorine resin tube layer is compressed more effectively with a lower input energy. Further, excessive melt flow characteristics of the fluorine resin tube was prevented because of the selective heating of the melt-bonding interface. As a result, the fluorine resin tube was tightly bonded to the substrate 31 without sagging at either end of the roller.

The substrate was cooled with the surface transfer member, and was removed from the surface transfer member. The fluorine resin tube was significantly tightly bonded to the substrate by heat-pressing between the substrate and the surface transfer member such that the fluorine resin tube did not peel from the substrate as in Example 1. The selective heating of the interface permitted a shorter heating cycle, without formation of bubbles or sagging.

The silicone rubber did not deteriorate during the melt-bonding process. The polyimide film is prepared with a high accuracy by coating a raw material on a master with a desired surface unevenness and curing it. Since the polyimide film has excellent high-temperature strength, the durability of the surface transfer member is improved. Further, the flexible polyimide film is easy to handle and can be fabricated by mass-production.

EXAMPLE 6

A substrate 31 was tightly sheathed with a heat-shrinkable PFA resin tube 315 as in Example 3. The fluorine resin tube was not bonded to the substrate and the surface of the fluorine resin tube had a ten-point average roughness Rz of 10 µm. Dead folds or wrinkles were left on the tube.

A surface transfer member 32 is a hollow cylinder with an inner diameter of 42.2 mm, and a thickness of 0.05 mm. The surface transfer member 32 in accordance with Example 6 was formed of a polyimide resin and the inner face of the surface transfer member 32 was provided with a surface roughness of 5 µm which was transferred to the fluorine resin tube covering on the substrate.

A substrate 31 sheathed with a heat-shrinkable fluorine resin tube and subjected to the heat-shrinking treatment was inserted into the surface transfer member 32 and fixed with a fixer not shown in the drawing such that the substrate 31 and the surface transfer member 32 had a common axis. A gap of approximately 60 µm was provided between the substrate 31 sheathed with the fluorine resin tube and the surface transfer member 32. The composite of the substrate 31 and the surface transfer member 32 was heated for approximately 3 minutes with a 3 kw infrared line heater 38 (a parallel beam type) with a length which was nearly equal to the length of the substrate and was about 50 mm distant from the surface transfer member 32. Since the polyimide surface transfer member and the fluorine resin tube absorbed only small amounts of infrared rays, these were slightly expanded by the infrared radiation, and the melt-bonding interface was selectively heated. Further, since the thermal expansion coefficient of the silicone rubber was larger than that of the polyimide surface transfer member, the 60-µm gap between the surface transfer member and the substrate disappeared as a result of thermal expansion of the silicone rubber and thus the fluorine resin tube layer is compressed more effectively with a lower input energy. Further, excessive melt flow characteristics of the fluorine resin tube was prevented because of the selective heating of the melt-bonding interface. As a result, the fluorine resin tube was tightly bonded to the substrate 31 without sagging at either end of the roller.

The substrate was cooled with the surface transfer member, and was removed from the surface transfer member. The melt-bonded fluorine resin tube had a ten-point average roughness Rz of 4.8 μm, and dead folds or wrinkles disappeared. The fluorine resin tube was significantly tightly bonded to the substrate by heat-pressing between the substrate and the surface transfer member such that the fluorine resin tube did not peel from the substrate as in Example 1. The selective heating of the interface permitted a shorter heating cycle, without formation of bubbles or sagging. The silicone rubber did not deteriorate during the melt-bonding process.

EXAMPLE 7

Figure 4A:
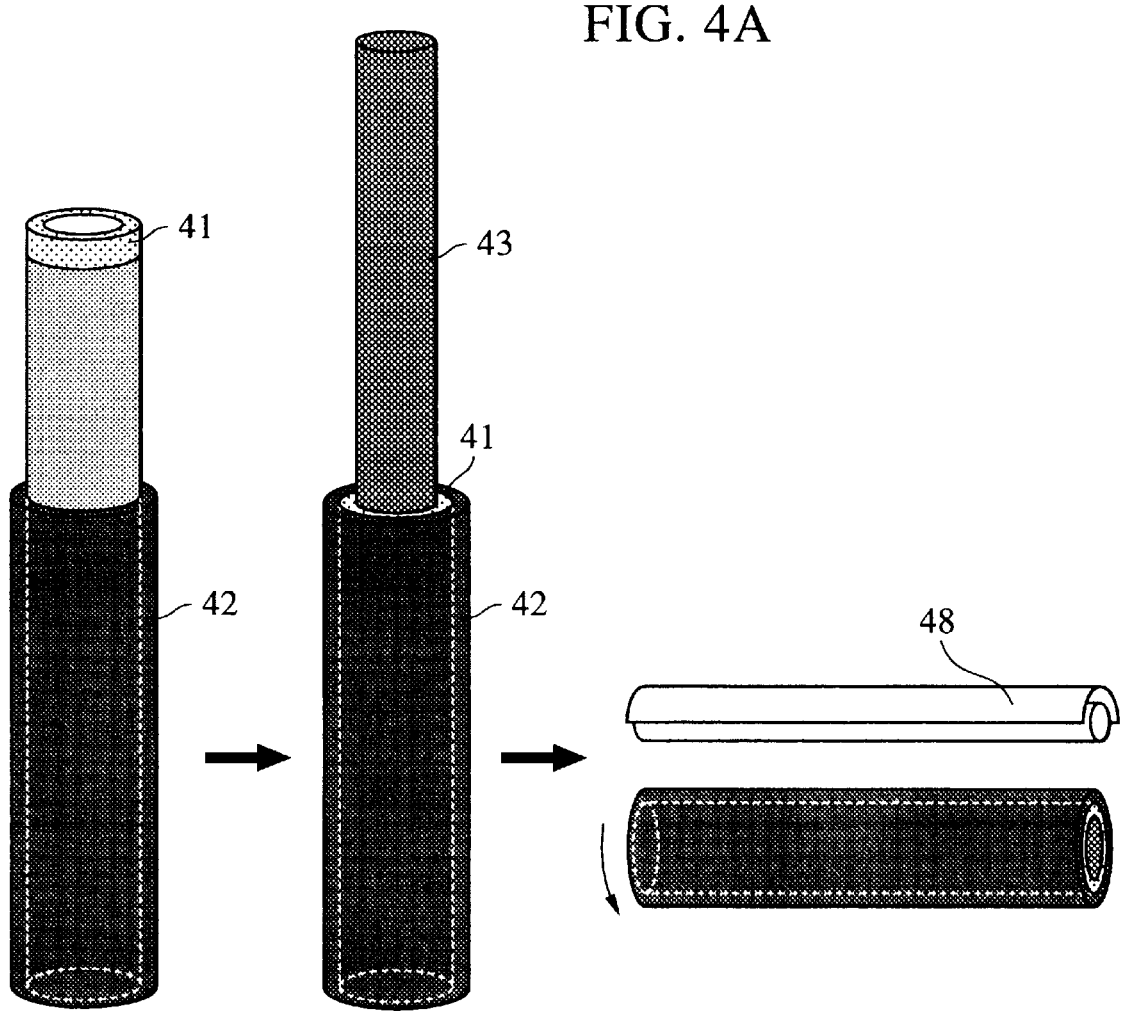
FIG. 4A is an outlined view of a method for forming a fluorine resin layer onto a cylindrical substrate using a cylindrical surface transfer member in accordance with Example 7 of the present invention.

The method in accordance with Example 7 will now be described with reference to FIGS. 4A and 4B.

Figure 4B:
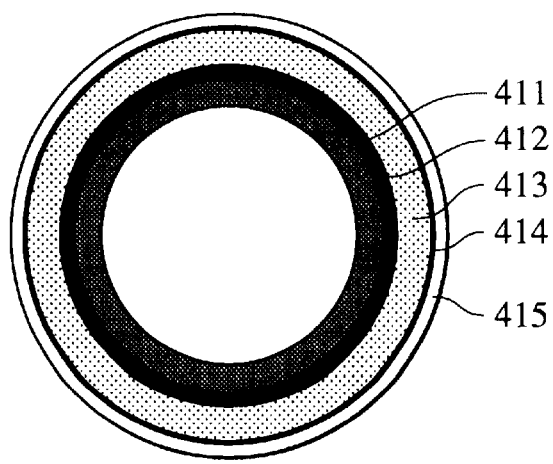
FIG. 4B is a cross-sectional view of the cylindrical substrate.

FIG. 4B is a cross-sectional view of a cylindrical substrate 41 provided with an outermost layer composed of a fluorine resin tube. The cylindrical substrate 41 is composed of a thermosetting polyimide film 411 and has a thickness of 50 μm and a diameter of 40 mm. A silicone rubber layer 413 with a thickness of 300 μm composed of the above-mentioned low-temperature-vulcanization (LTV) is bonded onto the polyimide film 411 with a primer layer 412 provided therebetween. The silicone rubber layer was formed by spraying a LTV silicon rubber in toluene solution onto the polyimide film, on which a primer was applied, and by curing it with heat. The primer layer 414 was provided to ensure tight adhesion between the silicone rubber layer 413 and the fluorine resin tube surface layer, and composed of the fluorine rubber and the fluorine resin (FEP) described in Example 2. The primer layer 414 with a thickness of 25 μm was formed by spraying an aqueous primer solution of the above resinous mixture and heating to cure it at 200° C. for 30 minutes. The cylindrical substrate was inserted into a heat-shrinkable fluorine resin tube 415, composed of a TFA copolymer, having an inner diameter of 44 mm, a thermal shrinkage factor of 15%, and a thickness of 25 μm. The fluorine resin tube 415 was heated at 200° C. for 15 minutes in an oven with internal air circulation. The substrate 41 was thereby tightly sheathed with fluorine resin tube 415, although the tube 415 did not adhered to the substrate 41. The fluorine resin tube was not bonded to the substrate, and its surface had a ten-point average roughness Rz of 10 μm. Dead folds or wrinkles were left on the tube.

A surface transfer member 42 is a hollow cylinder with an inner diameter of 42.8 mm, and a thickness of 0.05 mm. The surface transfer member 42 in accordance with Example 7 was formed of a polyimide resin and the inner face of the surface transfer member 42 was provided with a surface roughness of 5 μm which was transferred to the fluorine resin tube covering on the substrate.

An aluminum inner fixer 43 with an outer diameter which was equal to the inner diameter of the film was inserted in the substrate 41 sheathed with a heat-shrinkable fluorine resin tube and these were inserted into the surface transfer member 42 and fixed with a fixer not shown in the drawing such that the substrate 41 and the surface transfer member 42 had a common axis. A gap of approximately 60 μm was provided between the substrate 41 sheathed with the fluorine resin tube and the surface transfer member 42. The composite of the substrate 41 and the surface transfer member 42 was heated for approximately 3 minutes with a 3 kw infrared line heater 38 (a parallel beam type) with a length which was nearly equal to the length of the substrate and was about 50 mm distant from the surface transfer member 42. Since the polyimide surface transfer member and the fluorine resin tube absorbed only small amounts of infrared rays, these were slightly expanded by the infrared radiation, and the melt-bonding interface was selectively heated. Further, since the thermal expansion coefficient of the silicone rubber was larger than that of the polyimide surface transfer member, the 60-μm gap between the surface transfer member and the substrate disappeared as a result of thermal expansion of the silicone rubber and thus the fluorine resin tube layer is compressed more effectively with a lower input energy. Further, excessive melt flow characteristics of the fluorine resin tube was prevented because of the selective heating of the melt-bonding interface. As a result, the fluorine resin tube was tightly bonded to the substrate 41 without sagging at either end of the roller.

The substrate was cooled with the surface transfer member, and was removed from the surface transfer member. The melt-bonded fluorine resin tube had a ten-point average roughness Rz of 4.9 μm, and dead folds or wrinkles disappeared. The fluorine resin tube was significantly tightly bonded to the substrate by heat-pressing between the substrate and the surface transfer member such that the fluorine resin tube did not peel from the substrate as in Example 1. The selective heating of the interface permitted a shorter heating cycle, without formation of bubbles or sagging. The silicone rubber did not deteriorate during the melt-bonding process.

EXAMPLE 8

A fixing roller for color image-forming apparatuses was fabricated as in Example 6.

Figure 5:
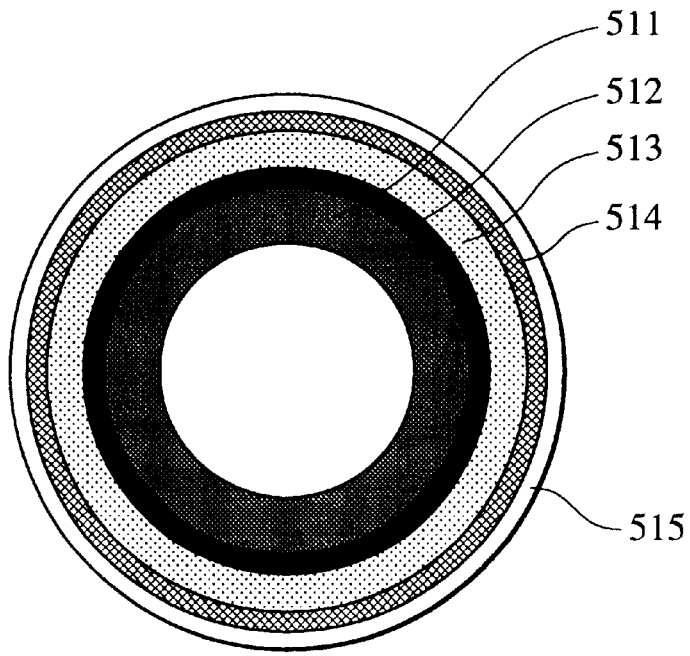
FIG. 5 is a cross-sectional view of a fixing roller in accordance with Example 8.

FIG. 5 is a cross-sectional view of a fixing roller used in color image-forming apparatuses. An aluminum core bar 511 of the fixing roller had a diameter of 58 mm. After a silicone rubber layer 513 with a thickness of 1 mm is bonded onto the aluminum core bar 511 with a primer layer 512 provided therewith, a primer layer 514 with a thickness of 25 μm composed of the above-mentioned mixture of fluorine rubber and fluorine resin were formed on the silicone rubber layer 513 by coating, the substrate was inserted into a heat-shrinkable PFA resin tube 515 with a thickness of 25 μm. The composite was heated at 200° C. for 15 minutes in an oven with internal air circulation. The substrate 51 was tightly sheathed with the heat-shrinkable PFA resin tube 515. The fluorine resin tube was not bonded to the substrate and its surface had a ten-point average roughness Rz of 10 μm. Dead folds or wrinkles were left on the tube.

The resulting fixing roller (Comparative Example 1) was inserted into a polyimide hollow cylindrical surface transfer member with an inner diameter of 60.2 mm and a thickness of 0.05 mm, and fixed. The composite of the substrate and the surface transfer member was heated for approximately 3 minutes with a 3 kw infrared line heater (a parallel beam type) with a length which was nearly equal to the length of the substrate and was about 50 mm distant from the surface transfer member. Also, three fixing rollers were fabricated using three surface transfer members having a surface of a ten-point average roughness Rz of 10 μm (Example 8-1), 5 μm (Example 8-2), and 2 μm (Example 8-3) as described above. The results of evaluation of these fixing rollers, as well as the surface roughness, are shown in Table 1.

TABLE 1

| | Surface roughness of surface transfer member Rz (μm) | Surface roughness fixing roller Rz (μm) | Irregular gloss |
|---|---|---|---|
| Comp. Ex. 1 | No transfer process | 15.2 | Observed |
| Ex. 8-1 | 10.0 | 10.3 | Slightly observed |
| Ex. 8-2 | 5.0 | 4.8 | Not observed |
| Ex. 8-3 | 2.0 | 2.3 | Not observed |

Comp. Ex.: Comparative Example; Ex.: Example

The results in Table 1 demonstrate that the roughness of the surface transfer member is satisfactorily duplicated onto the surface of the fluorine resin tube. Irregular gloss on the formed image obtained using a color image-forming apparatus can be prevented by controlling the surface roughness of the fluorine resin tube.

EXAMPLE 9

A pressure roller for image-forming apparatuses using film fixing systems driven by pressure rollers was fabricated as in Example 6.

Figure 6:
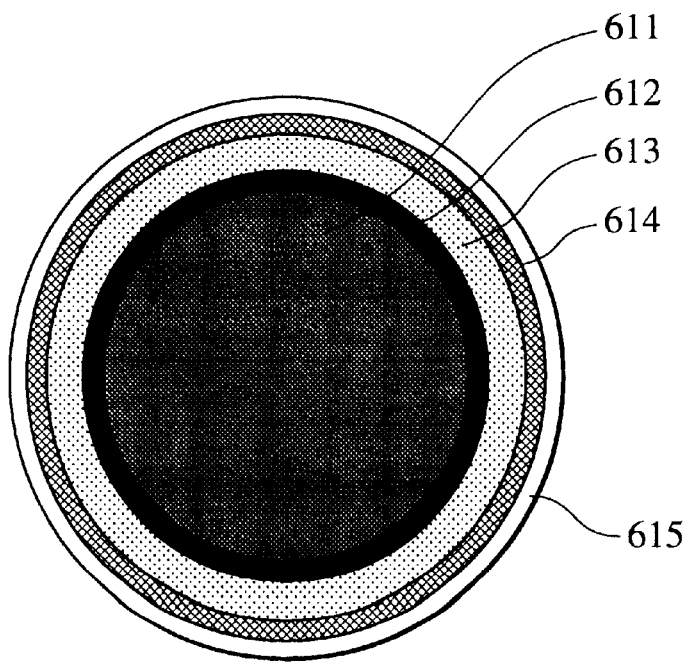
FIG. 6 is a cross-sectional view of a pressure roller in accordance with Example 9.

FIG. 6 is a cross-sectional view of a pressure roller used in fixing units using film fixing systems driven by pressure rollers. An aluminum core bar 611 of the pressure roller has a diameter of 10 mm. After a silicone rubber layer 613 with a thickness of 3 mm is bonded on the aluminum core bar 611 with a primer layer 612 provided therebetween a primer layer 614 with a thickness of 25 μm composed of the mixture of the fluorine rubber and the fluorine resin were formed on the silicone rubber layer 613 by coating as in Example 7, the composite was inserted into a heat-shrinkable PFA resin tube 615 with an inner diameter of 17 mm, a thermal expansion coefficient of 15% and a thickness of 25 μm. The composite was heated at 200° C. for 15 minutes in an oven with internal air circulation. The substrate 61 was tightly sheathed with the heat-shrinkable PFA resin tube 615. The fluorine resin tube was not bonded to the substrate, and its surface had a ten-point average roughness Rz of 10 μm. Dead folds or wrinkles were left on the tube.

The resulting pressure roller (Comparative Example 2) was inserted into a polyimide hollow cylindrical surface transfer member with an inner diameter of 16.6 mm and a thickness of 0.05 mm, and fixed. The composite of the substrate and the surface transfer member was heated for approximately 3 minutes with a 3 kw infrared line heater (a parallel beam type) with a length which was nearly equal to the length of the substrate and was about 50 mm distant from the surface transfer member. Also, three pressure rollers were fabricated using three surface transfer members having a surface of a ten-point average roughness Rz of 25 μm (Example 9-1), 10 μm (Example 9-2), and 5 μm (Example 9-3) as described above. The results of evaluation of these pressure rollers, as well as the surface roughness, are shown in Table 2. In the evaluation, the fixing rollers of Example 9 were used together with these pressure rollers.

TABLE 2

| | Surface roughness of surface transfer member Rz (μm) | Surface roughness or pressure roller Rz (μm) | Transferring Property |
|---|---|---|---|
| Comp. Ex. 2 | No transfer process | 3.9 | No good |
| Ex. 9-1 | 25.0 | 23.3 | Good |
| Ex. 9-2 | 10.0 | 9.3 | Good |
| Ex. 9-3 | 5.0 | 4.8 | Good |

Comp. Ex.: Comparative Example; Ex.: Example

The results in Table 2 demonstrate that the roughness of the surface transfer member is satisfactorily duplicated onto the surface of the fluorine resin tube. The transferring property of the film fixing unit driven with the pressure roller is improved by controlling the surface roughness of the fluorine resin tube.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for sheathing a substrate with a fluorine resin tube comprising: placing a substrate sheathed with a heat-shrinkable fluorine resin tube into a cylindrical surface transfer member and heat-pressing said heat-shrinkable fluorine resin tube between said substrate and said cylindrical surface transfer member so that said heat-shrinkable fluorine resin tube is melt-bonded to said substrate, wherein said substrate has a rubber layer.

2. A method for sheathing a substrate with a fluorine resin tube according to claim 1, wherein after said substrate is sheathed with said heat-shrinkable fluorine resin tube and said heat-shrinkable fluorine resin tube is shrunk, said heat-shrinkable fluorine resin tube is melt-bonded to said substrate.

3. A method for sheathing a substrate with a fluorine resin tube according to claim 1, wherein said heat-shrinkable fluorine resin tube is compressed by means of the difference in the thermal expansion coefficient between said substrate and said surface transfer member.

4. A method for sheathing a substrate with a fluorine resin tube according to claim 1, wherein said rubber layer is a fluorine rubber layer containing a fluorine resin, and the ratio by weight of the fluorine rubber and the fluorine resin ranges from 49:51 to 20:80.

5. A method for sheathing a substrate with a fluorine resin tube according to either claim 1 or claim 2, wherein said heat-shrinkable fluorine resin tube is melt-bonded with the heat by infrared radiation from the outside of said surface transfer member.

6. A method for sheathing a substrate with a fluorine resin tube according to claim 5, wherein said surface transfer member transmits 50% or more of the incident infrared rays.

7. A method for sheathing a substrate with a fluorine resin tube according to claim 6, wherein the absorption factor of the infrared rays is such that said surface transfer member≦said fluorine resin tube<said substrate surface.

8. A method for sheathing a substrate with a fluorine resin tube according to either claim 1 or claim 2, wherein unevenness on the surface of said surface transfer member is transferred to the surface of said fluorine resin tube.

9. A method for sheathing a substrate with a fluorine resin tube comprising:

placing a substrate sheathed with a heat-shrinkable fluorine resin tube into a cylindrical surface transfer member comprising a polyimide tube and heat-pressing said heat-shrinkable fluorine resin tube between said substrate and said cylindrical surface transfer member so that said heat-shrinkable fluorine resin tube is melt-bonded to said substrate.

10. A method for sheathing a substrate with a fluorine resin tube according to claim 9, wherein after said substrate is sheathed with said heat-shrinkable fluorine resin tube and said heat-shrinkable fluorine resin tube is shrunk, said heat-shrinkable fluorine resin tube is shrunk, said heat-shrinkable fluorine resin tube is melt-bonded to said substrate.

* * * * *

UNITED STATES PATENT AND TRADEMARK OFFICE
CERTIFICATE OF CORRECTION

PATENT NO. : 6,117,257
DATED : September 12, 2000
INVENTOR(S): MASAAKI TAKAHASHI, ET AL.

It is certified that error appears in the above-identified patent and that said Letters Patent is hereby corrected as shown below:

COLUMN 4:
Line 4, "ember," should read --member--.

COLUMN 11:
Line 46, "adhered" should read --adhere--.

COLUMN 13:
Line 35, "therebetween" should read --therebetween,--.

Signed and Sealed this

First Day of May, 2001

Attest:

NICHOLAS P. GODICI

Attesting Officer     Acting Director of the United States Patent and Trademark Office